United States Patent [19]

Bourrin

[11] 4,226,762
[45] Oct. 7, 1980

[54] ANTIFRICTION MATERIALS

[75] Inventor: Gilbert Bourrin, Lyons, France

[73] Assignee: Cestidur, Villeurbanne, France

[21] Appl. No.: 965,322

[22] Filed: Dec. 1, 1978

Related U.S. Application Data

[63] Continuation of Ser. No. 744,746, Nov. 24, 1976, abandoned.

[30] Foreign Application Priority Data

Nov. 26, 1975 [FR] France ............................. 75 36906

[51] Int. Cl.$^2$ .............................................. C08K 7/20
[52] U.S. Cl. .............................. 260/42.46; 260/42.15
[58] Field of Search ..................................... 260/42.46

[56] References Cited

U.S. PATENT DOCUMENTS 2,683,669  7/1954  Coler ........................... 260/DIG. 15

FOREIGN PATENT DOCUMENTS 1044503 10/1966 United Kingdom .
1416626 12/1975 United Kingdom .

OTHER PUBLICATIONS

Modern Plastics Encyclopedia, vol. 47, No. 10A, Oct. 1970, pp. 340, 398, and 400.
Modern Plastics Encyclopedia, 1976–1977, p. 174.
Ritter, James, Sphere-Filled Plastic Composites: Theory, Testing, Applications, Applied Poly. Symposium, No. 15, pp. 239–261, 1971.

*Primary Examiner*—James H. Derrington
*Attorney, Agent, or Firm*—Fleit & Jacobson

[57] ABSTRACT

A process for making an anti-friction material consisting of mixing between about 68 per cent and 84 per cent by weight of a plastic material in powdered form with between about 12 per cent and 28 per cent by weight of glass micro-globules with a grain size from 1 to 44$\mu$ and a density of 1.45 kg/l, and an antistatic material, and then in heating this mixture at high pressure.

5 Claims, No Drawings

ANTIFRICTION MATERIALS

This is a continuation of application Ser. No. 744,746, filed Nov. 24, 1976, now abandoned.

FIELD OF INVENTION

The present invention relates to a process for making an anti-friction material which is more particularly, although not exclusively, intended for the manufacture of parts of paper-making machines.

DESCRIPTION OF PRIOR ART

The machines of the type in question comprise, in a first part, known as the wet end, an endless band which is formed by means of a cloth having very fine meshes, which is intended for transporting the fibres which are to be dehydrated. The cloth or wire in question is supported at various points by a series of elements, especially by a forming plate, drainage members, doctors or "foils", suction boxes, etc. The aforementioned elements have in turn been made by means of wood cut against the grain, with addition of paraffin, phenoplasts, rubbers, polyurethane or polyethylene of very high molecular texture.

The endless band was first made by using a fabric of metallic wires, and more recently wires of a synthetic material such as polyester have been used.

When such cloths or wires are employed, the aforementioned elements wear very rapidly, for which reason they have been constructed of very hard materials, such as sintered ceramics.

The elements thus formed are in general satisfactory, but their use still presents problems, because of their fragility with respect to shocks, and the wear to which the band is subject on contact therewith. Moreover, the cost of such elements is very high.

The improvements which form the subject of the present invention have as an object the elimination of the aforementioned inconveniences and the establishment of a material which is economical, and yet has very good resistance to wear.

SUMMARY OF INVENTION

The process according to the invention consists of mixing approximately 80% by weight of a plastic material in powder form and of high molecular weight, at least about 17% by weight of micro-globules made of glass with a grain size from 1 to 44$\mu$ and a density of about 1.45 kg/l and approximately 4% by weight of an antistatic material, and then heating the mixture as thus obtained in a mould under very high pressures.

DESCRIPTION OF PREFERRED EMBODIMENT

About 80% by weight of high density polyethylene powder and about 16% by weight of glass micro-globules are intimately blended with about 4% by weight of an anti-static material. The mixture is then placed into a heated die or mould, preferably one defining the shape of the article to be produced, and is subjected to a very high pressure. The moulded parts constructed by this process are generally of relatively complex shape as compared with similar parts formed of ceramics, but are more easily formed in the mould or die and can be subsequently machined with cutting tools made of diamond, in the same way as a piece of steel with conventional tools. In other words, they can be drilled, milled or planed by means of a diamond tool of suitable shape.

Obviously any other plastic material of high molecular weight could be used in place of the polyethylene powder referred to above. Moreover, before mixing, the glass micro-globules may be coated with a varnish such as that sold under the name "SILANE" manufactured by the American company Union Carbide, which enhances the intimate association of the powder and the micro-globules.

One process for forming the mixture suitable for moulding or die forming is as follows:

A mixture comprising 75 kg of powdered polyethylene having molecular weight of between 1 and $6 \times 10^6$ (such as that sold under the trade mark "GUR" by the German company Ruhrchemie or under the trade mark "AC 1020" by the American company Allied Chemical), 15 kg of micro-globules made of glass having a grain size of between 1 and 44$\mu$ and a density of about 1.45 kg/l and 3.75 kg of compressed 140 acetylene black Y of apparent density 130 to 150 g/l (comprising the anti-static material) are fed into a fast mixer having internal vanes, such as the type "DIOSNA". The mixer is brought to a high speed for a period of 4 minutes to obtain an intimate blend of the components of the mixture. The latter is then transported in a bucket conveyor in small quantities to the place of use where it is placed in a mould or die and subjected to a pressure of between 60 to 100 kg/cm$^2$ in the presence of sufficient heat to cause the particles of the polyethylene powder to coalesce around the micro-globules. Pneumatic or belt conveyors are avoided because of the possibility that their use would interfere with the condition of the mixture during transportation.

The above quantities represent 80% polyethylene powder, 16% glass micro-globules and 4% acetylene black. Other preferred quantities are respectively 79.3%, 16.7%% and 4%. These percentages can be varied yet still further and yield an acceptable product. For example, the polyethylene constituent can vary between 68 and 84% and the micro-globule constituent between 12 and 28%.

Tests conducted employing elements made by the above process on a Bruderhaus paper-making machine using a plastic band or wire with a width of 3,100 mm displaced at a speed of 300 m/minute and carrying fibres intended for the manufacture of a 70-110 g paper containing 15% kaoline, have shown that such elements wear only about 0.5 mm after 100 days' use. This must be compared with a wear of 23 mm in elements made only of high density polyethylene after 30 days' use in such a machine. With the elements made according to the process of the invention, moreover, the life of the band or wire was doubled.

The foregoing description has been given by way of example and does not in any way limit the scope of the invention as defined in the appended claims.

I claim:

1. A moulded antifriction material having very good resistance to wear consisting essentially of, by weight, from about 68 to about 84% of polyethylene having a molecular weight from about $1 \times 10^6$ to about $6 \times 10^6$, from about 12 to about 28% of glass micro-beads having a grain size of from about 1 to about 44 microns and a density of about 1.45 kg/l, and the balance comprising an antistatic material.

2. The antifriction material of claim 1 wherein the proportion of polyethylene is about 79.3% and proportion of glass micro-beads is about 16.7%.

3. The antifriction material of claim 1 in which the antistatic material is present in the said mixture in the proportion of 4 percent by weight.

4. A moulded support for frictionally supporting an endless belt conveyor made of plastic material used in a papermaking machine, said moulded support comprising an antifriction material having very good resistance to wear consisting essentially of, by weight, from about 68 to about 84% polyethylene having a molecular weight from about $1 \times 10^6$ to about $6 \times 10^6$, from about 12 to about 28% of glass micro-beads having a grain size of from about 1 to about 44 microns and a density of 1.45 kg/l, and the balance comprising an antistatic material.

5. The support of claim 4 wherein the antifriction material comprises about 79.3% of the polyethylene component and about 16.7% of the glass micro-bead component.